(12) United States Patent   (10) Patent No.: US 8,763,959 B2
Shepshelovich et al.   (45) Date of Patent: Jul. 1, 2014

(54) TWO-ELEMENT AIRFOIL CONFIGURED FOR MINIMIZING ACCRETION OF CONTAMINANT

(75) Inventors: Michael Shepshelovich, Ganie Tikva (IL); Danny Abramov, Rehovot (IL)

(73) Assignee: Israel Aerospace Industries Ltd., Lod (IL)

( * ) Notice: Subject to any disclaimer, the term of this patent is extended or adjusted under 35 U.S.C. 154(b) by 186 days.

(21) Appl. No.: 13/119,319

(22) PCT Filed: Sep. 16, 2009

(86) PCT No.: PCT/IL2009/000903
§ 371 (c)(1),
(2), (4) Date: Mar. 16, 2011

(87) PCT Pub. No.: WO2010/032240
PCT Pub. Date: Mar. 25, 2010

(65) Prior Publication Data
US 2011/0168850 A1    Jul. 14, 2011

(30) Foreign Application Priority Data
Sep. 17, 2008 (IL) .......................... 194155
Sep. 17, 2008 (IL) .......................... 194156

(51) Int. Cl.
*B64C 3/14* (2006.01)
*B64C 9/18* (2006.01)

(52) U.S. Cl.
USPC .......................... 244/215; 244/130

(58) Field of Classification Search
USPC ............... 244/211–217, 123.1, 130
See application file for complete search history.

(56) References Cited

U.S. PATENT DOCUMENTS

| 1,353,666 | A | | 9/1920 | Page |
| 1,480,327 | A | * | 1/1924 | Wisenant .................. 244/35 R |
| 2,261,363 | A | | 11/1941 | Griswold |
| 2,378,528 | A | | 6/1945 | Arsandaux |
| 2,934,289 | A | | 4/1960 | Dzik |

(Continued)

FOREIGN PATENT DOCUMENTS

GB    2 374 331 A    10/2002

OTHER PUBLICATIONS

Notification of Transmittal of the International Search Report and the Written Opinion of the International Searching Authority, or the Declaration, International Application No. PCT/IL2009/000903, mailed on Mar. 10, 2010.

(Continued)

*Primary Examiner* — Joseph W Sanderson
*Assistant Examiner* — Marc Burgess
(74) *Attorney, Agent, or Firm* — Dorsey & Whitney LLP

(57) ABSTRACT

A two element aerofoil, and wing element based thereon, is provided, including a primary aerofoil element including a leading edge of the aerofoil and a secondary aerofoil element including a trailing edge of the aerofoil. A gap is provided between the primary aerofoil element and the secondary aerofoil element. The primary aerofoil element has at least one of a profile, orientation and location with respect to a respective at least one of a profile, orientation and location of the secondary aerofoil element that is configured for minimizing or avoiding accretion of contaminant on the secondary aerofoil element when subjected to an airflow that includes the contaminant, at least at one design set of conditions. A method for designing a two element aerofoil is also provided.

23 Claims, 13 Drawing Sheets

(56) References Cited

U.S. PATENT DOCUMENTS

| | | | |
|---|---|---|---|
| 2,937,826 A | | 5/1960 | Johnson |
| 3,136,501 A | | 6/1964 | Barber |
| 3,298,636 A | * | 1/1967 | Arnholdt ................. 244/198 |
| 3,847,369 A | | 11/1974 | Phillips et al. |
| 5,213,287 A | | 5/1993 | Barron |
| 5,294,080 A | * | 3/1994 | Ross ..................... 244/215 |
| 5,322,246 A | | 6/1994 | Henne et al. |
| 5,395,071 A | | 3/1995 | Felix |
| 5,651,513 A | * | 7/1997 | Arena .................... 244/216 |
| 6,015,117 A | | 1/2000 | Broadbent |
| 6,293,497 B1 | * | 9/2001 | Kelley-Wickemeyer et al. ................ 244/216 |
| 6,328,265 B1 | * | 12/2001 | Dizdarevic .............. 244/216 |
| 6,360,997 B1 | * | 3/2002 | Saiz ..................... 244/201 |
| 6,443,394 B1 | | 9/2002 | Weisend, Jr. |
| 6,905,092 B2 | * | 6/2005 | Somers .................. 244/216 |
| 6,910,662 B1 | | 6/2005 | Ofner |
| 7,195,210 B2 | | 3/2007 | Hamilton et al. |
| 7,980,515 B2 | | 7/2011 | Hunter |
| 7,992,827 B2 | | 8/2011 | Shepshelovich et al. |
| 2004/0195464 A1 | * | 10/2004 | Vassberg et al. ......... 244/216 |
| 2006/0169848 A1 | * | 8/2006 | Libby ................... 244/216 |
| 2007/0278354 A1 | | 12/2007 | Shepshelovich et al. |
| 2011/0168850 A1 | | 7/2011 | Shepshelovich et al. |

OTHER PUBLICATIONS

Written Opinion of the International Searching Authority, International Application No. PCT/IL2009/000903, mailed on Mar. 10, 2010.

Abbot, I. H., and Doenhoff, A.E., "Theory of Wing Sections", Dover Publications, Inc., New York, 1959, pp. 215,217 (4 pages).

U.S. Department of Transportation, Federal Aviation Administration, "Aircraft Icing" Handbook, DOT/FAA/CT-88/8-1, Mar. 1991, (390 pages).

Abramov, D., Shepshelovich, M., "Ice Accretion of Two-Element High-Lift UAV Wings", 53rd Israel Annual Conference on Aerospace Sciences, Mar. 6-7, 2013, pp. 1-29.

Abbot, I. H., and Doenhoff, A.E., "Theory of Wing Sections", Dover Publications, Inc., New York, 1959, pp. 228-229.

* cited by examiner

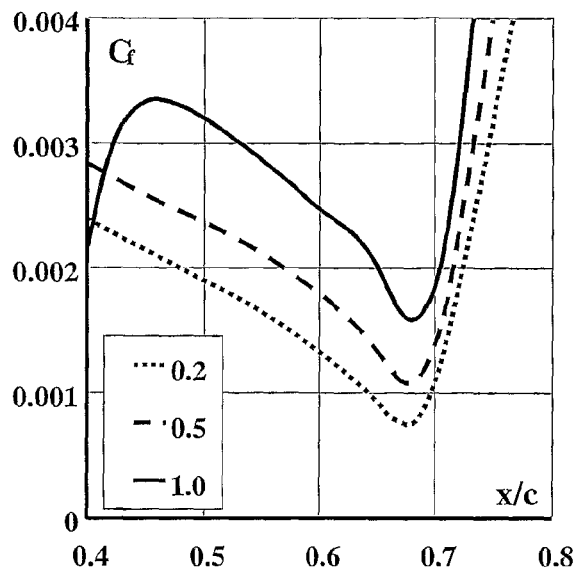
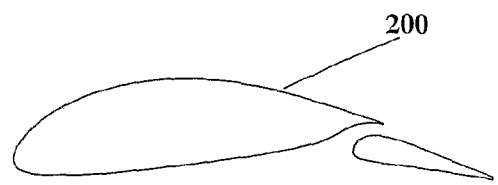
Fig. 10(b)
Fig. 10(a)
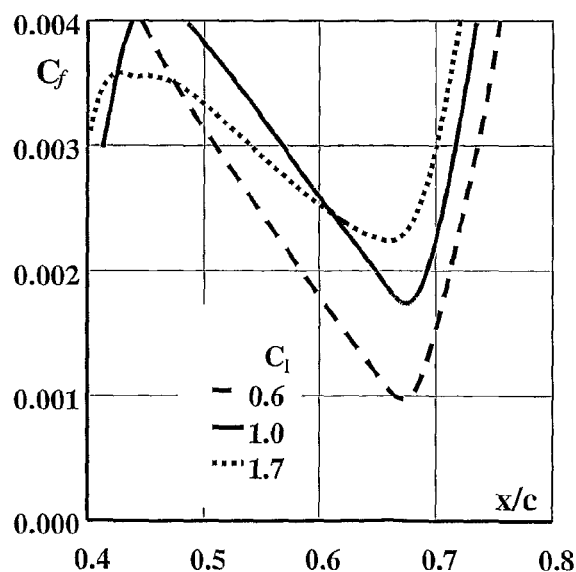
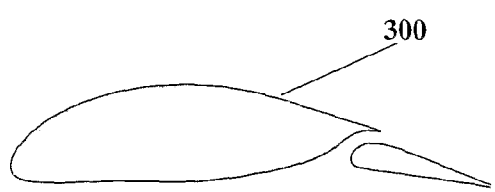
Fig. 11(b)
Fig. 11(a)

Primary airfoil element

| x | z | x | z | x | z |
|---|---|---|---|---|---|
| 0.773999 | 0.065165 | 0.021159 | 0.032428 | 0.581939 | 0.013517 |
| 0.589334 | 0.120141 | 0.012229 | 0.01915 | 0.618779 | 0.020734 |
| 0.546163 | 0.131705 | 0.006268 | 0.006462 | 0.63975 | 0.025896 |
| 0.507946 | 0.139903 | 0.004429 | -0.0003 | 0.660112 | 0.032697 |
| 0.479144 | 0.14471 | 0.003993 | -0.00667 | 0.67779 | 0.040772 |
| 0.433853 | 0.150103 | 0.004752 | -0.01146 | 0.697568 | 0.051655 |
| 0.401482 | 0.152358 | 0.006527 | -0.016 | 0.712665 | 0.05859 |
| 0.366138 | 0.153214 | 0.009704 | -0.02062 | 0.728204 | 0.062969 |
| 0.33079 | 0.152311 | 0.016486 | -0.02602 | 0.74605 | 0.065084 |
| 0.292273 | 0.149233 | 0.02469 | -0.02954 | 0.76374 | 0.064698 |
| 0.252607 | 0.143666 | 0.035641 | -0.03242 | 0.773691 | 0.063318 |
| 0.213387 | 0.135579 | 0.049127 | -0.03456 | | |
| 0.184339 | 0.127772 | 0.068951 | -0.03609 | | |
| 0.154336 | 0.117881 | 0.09698 | -0.03678 | | |
| 0.12502 | 0.106107 | 0.141483 | -0.03617 | | |
| 0.103385 | 0.095788 | 0.182789 | -0.03422 | | |
| 0.084502 | 0.085366 | 0.244653 | -0.02951 | | |
| 0.066344 | 0.073739 | 0.324938 | -0.02132 | | |
| 0.049182 | 0.060777 | 0.41686 | -0.01027 | | |
| 0.03132 | 0.044217 | 0.509745 | 0.002157 | | |

Secondary airfoil element

| x | z | x | z | x | z |
|---|---|---|---|---|---|
| 1.000000 | -0.03892 | 0.72736 | 0.032897 | 0.74291 | -0.00874 |
| 0.958080 | -0.0225 | 0.724716 | 0.031159 | 0.754936 | -0.01059 |
| 0.929166 | -0.01188 | 0.721969 | 0.028949 | 0.772895 | -0.01285 |
| 0.873351 | 0.009196 | 0.719764 | 0.026745 | 0.81918 | -0.01829 |
| 0.847721 | 0.018571 | 0.717787 | 0.024282 | 0.852651 | -0.02251 |
| 0.833255 | 0.023584 | 0.71608 | 0.021572 | 0.912544 | -0.03058 |
| 0.819804 | 0.027975 | 0.714616 | 0.018464 | 0.962786 | -0.03762 |
| 0.807159 | 0.031801 | 0.713687 | 0.015625 | 0.992038 | -0.04206 |
| 0.795786 | 0.034911 | 0.713135 | 0.012704 | 1.000000 | -0.0439 |
| 0.78554 | 0.037325 | 0.713018 | 0.01024 | | |
| 0.779363 | 0.038531 | 0.713189 | 0.00827 | | |
| 0.773243 | 0.039484 | 0.713615 | 0.006344 | | |
| 0.767474 | 0.040117 | 0.714304 | 0.004494 | | |
| 0.761809 | 0.040448 | 0.715322 | 0.002647 | | |
| 0.756143 | 0.040452 | 0.716402 | 0.001217 | | |
| 0.751168 | 0.040149 | 0.717655 | -6.6E-05 | | |
| 0.746746 | 0.0396 | 0.719636 | -0.0016 | | |
| 0.742401 | 0.038768 | 0.722739 | -0.00334 | | |
| 0.738157 | 0.037632 | 0.72638 | -0.00481 | | |
| 0.732992 | 0.035748 | 0.730788 | -0.00614 | | |
| 0.730127 | 0.03442 | 0.736613 | -0.00752 | | |

Fig. 17

| Primary airfoil element | | | | |
|---|---|---|---|---|
| x | z | x | z | |
| 0.773999 | 0.065165 | 0.004429 | -0.000299 | 0.481095 | -0.024943 |
| 0.589334 | 0.120141 | 0.003993 | -0.006671 | 0.506928 | -0.020856 |
| 0.546163 | 0.131705 | 0.004752 | -0.011455 | 0.531282 | -0.016463 |
| 0.507946 | 0.139903 | 0.006527 | -0.015999 | 0.554163 | -0.011821 |
| 0.479144 | 0.14471 | 0.009704 | -0.020616 | 0.575477 | -0.006994 |
| 0.433853 | 0.150103 | 0.016486 | -0.026021 | 0.595124 | -0.002063 |
| 0.401482 | 0.152358 | 0.02469 | -0.029538 | 0.613039 | 0.00294 |
| 0.366138 | 0.153214 | 0.035641 | -0.032423 | 0.629147 | 0.00803 |
| 0.33079 | 0.152311 | 0.049127 | -0.034561 | 0.643375 | 0.013242 |
| 0.292273 | 0.149233 | 0.068951 | -0.036089 | 0.655634 | 0.018569 |
| 0.252607 | 0.143666 | 0.09698 | -0.036781 | 0.665883 | 0.02391 |
| 0.213387 | 0.135579 | 0.141483 | -0.03617 | 0.674243 | 0.029089 |
| 0.184339 | 0.127772 | 0.176111 | -0.034793 | 0.68127 | 0.034078 |
| 0.154336 | 0.117881 | 0.210734 | -0.033414 | 0.69155 | 0.042029 |
| 0.12502 | 0.106107 | 0.242939 | -0.032964 | 0.702995 | 0.050304 |
| 0.103385 | 0.095788 | 0.270461 | -0.033278 | 0.713986 | 0.05649 |
| 0.084502 | 0.085366 | 0.29815 | -0.033923 | 0.725122 | 0.06089 |
| 0.066344 | 0.073739 | 0.329812 | -0.034713 | 0.736686 | 0.063709 |
| 0.049182 | 0.060777 | 0.362364 | -0.034872 | 0.748682 | 0.065025 |
| 0.03132 | 0.044217 | 0.394103 | -0.033909 | 0.760601 | 0.064962 |
| 0.021159 | 0.032428 | 0.424697 | -0.031723 | 0.771285 | 0.063756 |
| 0.012229 | 0.01915 | 0.453709 | -0.02862 | 0.773691 | 0.063318 |
| 0.006268 | 0.006462 | | | | |

| Secondary airfoil element | | | | |
|---|---|---|---|---|
| x | z | x | z | |
| 1.000000 | -0.038924 | 0.71608 | 0.021572 |
| 0.95808 | -0.0225 | 0.714616 | 0.018464 |
| 0.929166 | -0.011882 | 0.713687 | 0.015625 |
| 0.873351 | 0.009196 | 0.713135 | 0.012704 |
| 0.847721 | 0.018571 | 0.713018 | 0.01024 |
| 0.833255 | 0.023584 | 0.713189 | 0.00827 |
| 0.819804 | 0.027975 | 0.713615 | 0.006344 |
| 0.807159 | 0.031801 | 0.714304 | 0.004494 |
| 0.795786 | 0.034911 | 0.715322 | 0.002647 |
| 0.78554 | 0.037325 | 0.716402 | 0.001217 |
| 0.779363 | 0.038531 | 0.717655 | -0.000066 |
| 0.773243 | 0.039484 | 0.719636 | -0.0016 |
| 0.767474 | 0.040117 | 0.722739 | -0.003335 |
| 0.761809 | 0.040448 | 0.72638 | -0.004808 |
| 0.756143 | 0.040452 | 0.730788 | -0.00614 |
| 0.751168 | 0.040149 | 0.736613 | -0.007517 |
| 0.746746 | 0.0396 | 0.74291 | -0.008736 |
| 0.742401 | 0.038768 | 0.754936 | -0.010594 |
| 0.738157 | 0.037632 | 0.772895 | -0.01285 |
| 0.732992 | 0.035748 | 0.81918 | -0.018285 |
| 0.730127 | 0.03442 | 0.852651 | -0.022505 |
| 0.72736 | 0.032897 | 0.912544 | -0.030584 |
| 0.724716 | 0.031159 | 0.962786 | -0.037623 |
| 0.721969 | 0.028949 | 0.992038 | -0.042057 |
| 0.719764 | 0.026745 | 1.000000 | -0.043898 |
| 0.717787 | 0.024282 | | |

Primary airfoil element

| x | z | x | z |
|---|---|---|---|
| 0.773999 | 0.065165 | 0.183802 | 0.127612 |
| 0.75693 | 0.070189 | 0.162195 | 0.120666 |
| 0.73617 | 0.076338 | 0.141059 | 0.112832 |
| 0.713447 | 0.083107 | 0.120505 | 0.10408 |
| 0.689783 | 0.090188 | 0.100667 | 0.094376 |
| 0.666145 | 0.09728 | 0.081727 | 0.083702 |
| 0.642775 | 0.104295 | 0.063921 | 0.072041 |
| 0.619083 | 0.111379 | 0.047522 | 0.059393 |
| 0.595655 | 0.118307 | 0.032914 | 0.045872 |
| 0.5726 | 0.124856 | 0.020674 | 0.031798 |
| 0.549824 | 0.13081 | 0.011506 | 0.017863 |
| 0.527128 | 0.136055 | 0.005933 | 0.005488 |
| 0.504339 | 0.140567 | 0.003971 | -0.004544 |
| 0.481368 | 0.144378 | 0.005876 | -0.014642 |
| 0.458244 | 0.147519 | 0.014458 | -0.024766 |
| 0.435035 | 0.149995 | 0.030711 | -0.031285 |
| 0.411804 | 0.151788 | 0.054298 | -0.0351 |
| 0.388587 | 0.152869 | 0.084632 | -0.036605 |
| 0.3654 | 0.153214 | 0.119283 | -0.036697 |
| 0.342256 | 0.152802 | 0.1556 | -0.035633 |
| 0.319174 | 0.151617 | 0.192108 | -0.03363 |
| 0.296177 | 0.149647 | 0.2284 | -0.031344 |
| 0.273299 | 0.146883 | 0.263922 | -0.029235 |
| 0.250579 | 0.143313 | 0.297654 | -0.027654 |
| 0.228058 | 0.138921 | 0.327275 | -0.026887 |
| 0.205781 | 0.133692 | 0.353259 | -0.027368 |

| x | z | x | z |
|---|---|---|---|
|   |   | 0.377934 | -0.029476 |
|   |   | 0.404639 | -0.032612 |
|   |   | 0.434178 | -0.035288 |
|   |   | 0.463059 | -0.035684 |
|   |   | 0.490707 | -0.03414 |
|   |   | 0.517243 | -0.031005 |
|   |   | 0.54153 | -0.026894 |
|   |   | 0.563937 | -0.022191 |
|   |   | 0.584728 | -0.017063 |
|   |   | 0.603798 | -0.011615 |
|   |   | 0.621099 | -0.005866 |
|   |   | 0.636489 | 0.000072 |
|   |   | 0.649811 | 0.006148 |
|   |   | 0.660965 | 0.012296 |
|   |   | 0.669974 | 0.018361 |
|   |   | 0.677093 | 0.02413 |
|   |   | 0.684199 | 0.030823 |
|   |   | 0.694241 | 0.040975 |
|   |   | 0.703894 | 0.049468 |
|   |   | 0.713464 | 0.055619 |
|   |   | 0.723644 | 0.060121 |
|   |   | 0.734585 | 0.063183 |
|   |   | 0.746191 | 0.064816 |
|   |   | 0.758004 | 0.065068 |
|   |   | 0.768898 | 0.064127 |
|   |   | 0.773691 | 0.063318 |

Secondary airfoil element

| x | z | x | z |
|---|---|---|---|
| 1.000000 | -0.038924 | 0.71608 | 0.021572 |
| 0.95808 | -0.0225 | 0.714616 | 0.018464 |
| 0.929166 | -0.011882 | 0.713687 | 0.015625 |
| 0.873351 | 0.009196 | 0.713135 | 0.012704 |
| 0.847721 | 0.018571 | 0.713018 | 0.01024 |
| 0.833255 | 0.023584 | 0.713189 | 0.00827 |
| 0.819804 | 0.027975 | 0.713615 | 0.006344 |
| 0.807159 | 0.031801 | 0.714304 | 0.004494 |
| 0.795786 | 0.034911 | 0.715322 | 0.002647 |
| 0.78554 | 0.037325 | 0.716402 | 0.001217 |
| 0.779363 | 0.038531 | 0.717655 | -0.000066 |
| 0.773243 | 0.039484 | 0.719636 | -0.0016 |
| 0.767474 | 0.040117 | 0.722739 | -0.003335 |
| 0.761809 | 0.040448 | 0.72638 | -0.004808 |
| 0.756143 | 0.040452 | 0.730788 | -0.00614 |
| 0.751168 | 0.040149 | 0.736613 | -0.007517 |
| 0.746746 | 0.0396 | 0.74291 | -0.008736 |
| 0.742401 | 0.038768 | 0.754936 | -0.010594 |
| 0.738157 | 0.037632 | 0.772895 | -0.01285 |
| 0.732992 | 0.035748 | 0.81918 | -0.018285 |
| 0.730127 | 0.03442 | 0.852651 | -0.022505 |
| 0.72736 | 0.032897 | 0.912544 | -0.030584 |
| 0.724716 | 0.031159 | 0.962786 | -0.037623 |
| 0.721969 | 0.028949 | 0.992038 | -0.042057 |
| 0.719764 | 0.026745 | 1.000000 | -0.043898 |
| 0.717787 | 0.024282 |   |   |

TWO-ELEMENT AIRFOIL CONFIGURED FOR MINIMIZING ACCRETION OF CONTAMINANT

This is a National Phase Application filed under 35 U.S.C. 371 as a national stage of PCT/IL2009/000903, with the filing date of Sep. 16, 2009 an application claiming the benefit from the Israeli Application No. 194156, filed on Sep. 17, 2008, and Application No. 194155, filed on Sep. 17, 2008, the entire content of each of which is hereby incorporated by reference in its entirety.

FIELD OF THE INVENTION

This invention relates to aerofoils and wings based on aerofoils, and in particular to methods and devices for reducing or preventing contamination of the same.

BACKGROUND OF THE INVENTION

Contaminants, for example ice, rain, water droplets, sand, smoke particles, dust particles, or other contaminants that may accumulate on external surfaces of aircraft, particularly aerofoils and other aerodynamic surfaces, can seriously affect the aerodynamic performance, in particular the lift and drag characteristics, of the aircraft, and can also change the weight and centre of gravity of the aircraft.

For laminar wings, relatively minor wing contamination or flow disturbances (depending on Reynolds number) can produce a complete loss of laminar flow on the wing surfaces, and the loss of laminar flow results in drag penalties and to deterioration of maximum lift. However, strong contamination with the ensuing more significant flow disturbances, may go beyond simple loss of laminar flow and may result in fully turbulent flow on the wing surfaces. For turbulent wings, increase of flow disturbances produce a further deterioration of maximum lift and a further increase of drag penalties. If contamination and the flow disturbances continue to increases, the wings may become unflyable.

De-icing apparatus are known and operate by periodically removing ice after it accumulates, by thermal, chemical or mechanical means. Anti-icing apparatus are also known, and attempt to prevent the formation of ice in the first place.

Thermal anti-icing systems include bleed air systems that use exhaust gas from the aircraft to heat air which is circulated in ducts running along areas of the aircraft where it is wished to prevent the ice build up, preventing the ice from forming or melting the same. Electro-thermal systems use electrically powered heating elements on these areas of the aircraft.

Other anti-icing systems use a chemical such as antifreeze, injected to the ice-prone surfaces to prevent the ice from forming. For example, by way of general background, in U.S. Pat. No. 5,322,246 a chemical or thermal deicing or running wet anti-icing device is located in or on the airfoil upstream of an aft facing step situated across the span of a single element airfoil, and causes water to run back towards the step. The step suddenly reduces the thickness of the airfoil chord section, which causes a disturbance in the boundary layer across the span of the airfoil downstream of the step. According to the patent, the aforementioned disturbance causes runback water to form droplets and be blown clear of the airfoil surface downstream of the step.

Known anti-icing systems are generally directed to single aerofoil element, and are not directed to wings based on two-element slotted aerofoils, in particular to the accumulation of ice, rain or other contaminants on the second element of such aerofoils.

Solutions for dealing with other types of contaminants with respect to aerofoils or wing surfaces are not generally known or used.

SUMMARY OF THE INVENTION

The present invention relates to methods and devices for reducing or preventing contamination, in particular ice accretion, heavy rain or other contaminants, on slotted aerofoils.

Herein, the term "slotted airfoil" refers to two-element airfoils composed of a first element (also referred to herein as a primary aerofoil element), the main aerofoil body, and a second element (also referred to herein as a secondary aerofoil element), in the form of a flap or aileron segment. The second element of slotted airfoils is permanently separated from the main body by a slot which is substantially open for the airflow at any deflection of the flap, and the second element does not retract to a retracted position that results in the substantially closed aerodynamic contours of a single-element airfoil. A feature of this structure is that it facilitates actuation of the second element through positive or negative deflection angles. Another feature of this structure is that a box-like relatively rigid construction may be achieved. With the second aerofoil element optionally coupled to actuators, the slotted airfoils of the invention provide the features of adjustable geometry and have built-in options for operating as take-off/landing flaps, ailerons, airbrake and for providing decambering at maximum speed flight. Slotted airfoils according to the invention are mission-adaptive, two-element, high-lift arrangements, and are inherently high-lift airfoils that are particularly suitable for development of long endurance UAV and other aircraft, loitering at high lift coefficients, in particular under unfavorable conditions in which contaminants could potentially cause an accretion problem and/or increase turbulent flow.

Slotted airfoils according to at least some embodiments of the invention are essentially high-lift wing sections, that benefit from the airflow through the slot of two-element arrangement to achieve high maximum lift, and in which passage of contaminants through the gap and onto the second element is minimized or avoided. Positive flap deflections of the second element of these airfoils may produce a further enhancement of maximum lift, and an improvement in minimizing or avoiding accretion of contaminants, but this may be accompanied with some degradation of their stall characteristics.

According to one aspect of the invention there is provided a two element aerofoil comprising a primary aerofoil element including a leading edge of the aerofoil and a secondary aerofoil element including a trailing edge of the aerofoil, and comprising a gap (also referred to herein as a slot or as a permanent slot) between said primary aerofoil element and said secondary aerofoil element, the primary aerofoil element having at least one parameter (e.g including one or more of a profile, orientation and location) with respect to a respective at least one parameter (e.g. including one or more of a respective a profile, orientation and location) of said secondary aerofoil element configured for minimizing or avoiding accretion of contaminant on said secondary aerofoil element when subjected to an airflow comprising said contaminant, at least at one design or predetermined set of conditions. Such a parameter may be a geometric parameter and/or an aerodynamic parameter. Such a design or predetermined set of conditions may comprise, for example, a range of flight conditions, or the range of lift coefficients covering certain mission stages, for example loitering and/or cruising.

The contaminant may be in the form of particulate matter flowing in a downstream direction with respect to said leading edge of said aerofoil, for example the particulate matter may comprise at least one of ice, snow, rain, water droplets, sand, smoke particles or dust particles.

The pressure surface of said primary aerofoil element may comprise a pressure surface profile configured for minimizing accretion of said particulate matter on said secondary aerofoil element. The pressure surface profile may be configured for minimizing flow into said gap of said particulate matter that may be flowing over said pressure surface. The pressure surface profile may be configured for minimizing or preventing flow into said gap of said particulate matter that may be flowing along or proximate to a boundary layer over said pressure surface.

The pressure surface profile may be further configured to enable airflow through said gap for enabling aerodynamic operation of said two element aerofoil. The airflow through said gap may be generally consistent with providing high lift aerodynamic characteristics to said aerofoil.

The aerofoil may comprise a profile configured to ensure that, i.e. compelling, at least some streamlines proximate to said pressure surface of said primary aerofoil element follow a path including over a suction surface of said secondary aerofoil element via said gap, while concurrently providing, i.e. imparting, a trajectory to particulate matter flowing proximate to said pressure surface of said primary aerofoil element such as to cause said particulate matter to overshoot said gap.

In at least some embodiments, the pressure surface profile extends outwardly along at least a portion of the chord of said primary aerofoil element with respect to a baseline pressure surface profile. In at least one embodiment, the pressure surface profile comprises a generally convex curvature along a portion of the chord of said primary aerofoil element, said portion being intermediate between said leading edge of the aerofoil and a trailing end of said primary aerofoil element Such a generally convex curvature may comprise any suitable outwardly-curved profile, and is not restricted to a rounded curvature as in the outside of a cylinder. In at least another embodiment, the pressure surface profile comprises a generally concave portion configured for imparting a centrifugal force component to said particulate matter, and a downstream generally convex portion joined thereto at an inflexion point. The generally concave portion may comprise any suitable inwardly-curved profile, and is not restricted to a rounded curvature as in the inside of a cylinder. In yet another embodiment, the primary element comprises a first cross-sectional thickness that effectively overlaps a second cross-sectional thickness of the secondary element when viewed from the flow direction upstream of the aerofoil, at angles of attack of at least zero and close thereto, and, as before, the generally concave portion may comprise any suitable inwardly-curved profile, and is not restricted to a rounded curvature as in the inside of a cylinder. The extent and curvature of each of the convex and concave portions may be determined on a case-by-case basis. In some embodiments, the primary element may comprise a first cross-sectional thickness having a boundary corresponding to the pressure side of the primary element that effectively overlaps at least an upstream portion of the pressure surface of the secondary element when viewed from the flow direction upstream of the aerofoil.

For example, the secondary element may be configured for selective deflection in the range between about +25° and about −25° degrees.

In at least some embodiments, the extent to which the main aerofoil element can provide shielding to the secondary element generally depends on the flight regime in which the aircraft/wing is flying, and thus on the respective lift coefficient and angle of attack of the wing. (It is to be noted that in practice a wing is often mounted onto a fuselage at some positive incidence, increasing the lift at zero angle of attack (CL0) and decreasing actual flight angles of attack measured with respect to the body, and that 3-dimensional effects of real wings often need to be taken into account when considering wing performance based on 2-dimensional models.) Such flight regimes may include, for example, loitering at high lift coefficients (CL~1.5-1.7), cruising flight at medium lift (CL~1.0-1.2) and high speed flight at small lift coefficients (CL~0.3-0.5). In some embodiments, the aircraft comprising wings based on such aerofoils may be designed for high loitering lift coefficients, flying at relatively high positive angles of attack—for example a UAV. At such conditions, the second aerofoil element may be exposed to the airflow with contaminants such as ice, or water droplets, and the shielding effect provided by the main aerofoil element may not be very high. This situation may be alleviated in a number of ways. For example, the angle of attack at loitering may be decreased, flying the aircraft at smaller lift coefficients while trying to provide some shielding effect on the second element by means of the main aerofoil element. This option, however, reduces the loitering efficiency of high-lift flight.

Another option for enhancing shielding effect of the main aerofoil element is reducing the angle of attack while compensating with concurrently providing positive deflection angle of the secondary aerofoil element—this provides the required lift coefficient for high-lift loitering flight, and provides an additional benefit in shielding effect, relative to providing the required lift coefficient by means of angle of attack only with zero deflection of the secondary element. Note, that for flight at difficult weather conditions, the flow over the wing is expected to be turbulent with resulting degradation of maximum lift of the aircraft. Considering speed safety margin, the loitering lift coefficients are often reduced accordingly, helping, at the same time, to improve the shielding effect. For this case, positive flap deflections help to recover the maximum lift of configuration and decrease further a required loitering angle of attack.

The range of design angles of attack that may provide shielding may vary for different design cases, depending on airfoil geometry (especially the shape of lower surface), design loitering lift coefficient, lift coefficient at zero angle of attack ($C_{L0}$), wing incidence on fuselage ($i_w$), etc. Once an acceptable level of shielding effect at high loitering lift coefficient is achieved for an aerofoil design (typically the most difficult case because of flap exposure to airflow is maximum), shielding of the secondary aerofoil element at other flight regimes such as cruise and maximum speed flight is automatically achieved because of reduced angles of attack in these regimes.

As discussed, another option according to the present invention is to provide a pressure surface contour that provides shielding by inducing particle trajectories for contaminants that effectively overshoot the leading edge of the secondary element, even at positive angles of attack. In one variation of this option a removable panel is provided at the aft portion of the pressure surface of the main aerofoil element, while in another variation, the main aerofoil body is integrally formed with such a pressure surface contour. This may be further supported by also providing positive secondary element deflections for reduction of required loitering angle of attack.

Alternatively, such panels may be designed for installation at mid and forward portions of the pressure surface of the main aerofoil element.

In some embodiments, the aerofoil may be configured as a high lift two element aerofoil.

According to another aspect of the invention, the aerofoil may comprise at least one of the aforesaid features and elements according to the first aspect of the invention, and furthermore, the leading edge of said primary aerofoil element is blunt having a first leading edge radius, wherein a ratio of said first radius to a chord of said aerofoil is greater than a threshold value, said threshold value representing a minimum radius to chord ratio obtained from geometric data of NACA 4-digit aerofoils at a comparable value of thickness to chord ratio to that of said aerofoil. Optionally, a leading edge of said secondary aerofoil element may also be blunt having a second leading edge radius, wherein a ratio of said second radius to a chord of said second element is greater than a threshold value, said threshold value representing a minimum radius to chord ratio obtained from geometric data of NACA 4-digit aerofoils at comparable value of thickness to chord ratio to that of said second element.

According to other aspects of the invention, there is provided a wing wherein at least a span portion thereof is based on at least one aerofoil as defined herein.

According to other aspects of the invention, there is provided an air vehicle comprising a wing wherein at least a span portion thereof is based on at least one aerofoil as defined herein. The wings may be the main lift-producing wings of said air vehicle. For example, the air vehicle may be an Unmanned Air Vehicle (UAV), in particular adapted for long range endurance and loitering.

According to yet another aspect of the invention there is provided a method for minimizing or avoiding accretion of contaminant on a two element aerofoil, said aerofoil comprising a primary aerofoil element including a leading edge of the aerofoil and a secondary aerofoil element including a trailing edge of the aerofoil, and a gap therebetween, the method comprising providing the primary aerofoil element with at least one of a profile, orientation and location with respect to a respective at least one of a profile, orientation and location of said secondary aerofoil element such as to minimizing or avoiding accretion of contaminant on said secondary aerofoil element when subjected to an airflow comprising said contaminant, at least at one design set of conditions.

The method may comprise aligning said primary aerofoil element at an angle of attack, and aligning said secondary aerofoil element at a deflection angle with respect to the primary aerofoil element, such as to ensure some streamlines proximate to a pressure surface of said primary aerofoil element follow a path to a suction surface of said secondary aerofoil element via said gap, while concurrently providing a trajectory to particulate matter flowing proximate to said pressure surface of said primary aerofoil element such as to cause said particulate matter to overshoot said gap and not impinge on the leading edge of the secondary aerofoil element. Optionally, said angle of attack and said deflection angle are such as to enable said primary aerofoil element to effectively shield the secondary aerofoil element from said particulate matter. For example, said angle of attack may be non-positive, and said deflection angle may be positive.

According to yet another aspect of the invention there is provided a method for designing a two element aerofoil comprising a primary aerofoil element including a leading edge of the aerofoil and a secondary aerofoil element including a trailing edge of the aerofoil, and a gap therebetween, the method including the step of generating an aerofoil profile such as to ensure that at least some streamlines proximate to a pressure surface of said primary aerofoil element follow a path including over a suction surface of said secondary aerofoil element via said gap, while concurrently providing a trajectory to particulate matter flowing proximate to said pressure surface of said primary aerofoil element such as to cause said particulate matter to overshoot said gap.

According to yet another aspect of the invention there is provided a method for operating an air vehicle comprising:
providing said air vehicle with wings according to some aspects of the invention;
flying the air vehicle at adverse conditions including contaminants in the air flow.

A feature of at least some embodiments of the invention is that in adverse icy conditions, for example, ice accretion on the second aerofoil element is reduced or altogether avoided, which could otherwise produce severe deterioration of control of, and/or of the efficiency or lift generated by, the aerofoil—which in extreme cases could prevent rotation of the second element and lead to complete loss of control power. The profile of the main element of the aerofoil with respect to the secondary element, and/or one or both of the location and orientation of the secondary element with respect to the primary aerofoil element can provide a beneficial shielding effect on the secondary element, preventing ice formation on the leading edge thereof. At the same time, this is achieved while providing attached flow around the primary and secondary elements, and through the slot.

By convex, or generally convex, is meant that a surface bulges in a generally outward direction, though the shape of the surface is not necessarily cylindrical, and thus the terms convex or generally convex include any surface in which the rate of change of slope of the surface is generally reducing towards the peak of the surface. Conversely, by concave, or generally concave, is meant that a surface bulges in a generally inward direction, or that a surface bulges in an outward direction but in a manner in which the rate of change of slope of the surface is generally increasing towards the peak of the surface, though the shape of the surface is not necessarily cylindrical. Thus, when referring to a surface or a cross-section of a surface, the terms convex or generally convex are herein also taken to refer to a profile of the surface or cross-section of the surface wherein normals to the profile along consecutive or adjacent points on the profile generally diverge from one another, while the terms concave or generally concave are herein also taken to refer to a profile of the surface or cross-section of the surface wherein normals to the profile along consecutive or adjacent points on the profile generally converge towards one another.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 6(*b*) illustrates leading edge geometry of the embodiment of FIG. 1, including a large leading edge radius and a protection area (region of reduced curvature) downstream of the leading edge radius along the suction surface.

FIG. 10(a) provides distributions of skin friction coefficients obtained with a baseline aerofoil (illustrated in FIG. 10(b)) at a number of lift coefficients.

FIG. 11(a) provides distributions of skin friction coefficients obtained with the embodiment of FIG. 1 (also illustrated in FIG. 11(b)) at a number of lift coefficients.

FIG. 17 lists normalized coordinates of the datum aerofoil of FIG. 1.

FIG. 18 lists normalized coordinates of the aerofoil according to the first embodiment of the invention.

FIG. 19 lists normalized coordinates of the aerofoil according to the second embodiment of the invention.

DETAILED DESCRIPTION OF EMBODIMENTS

Figure 1:
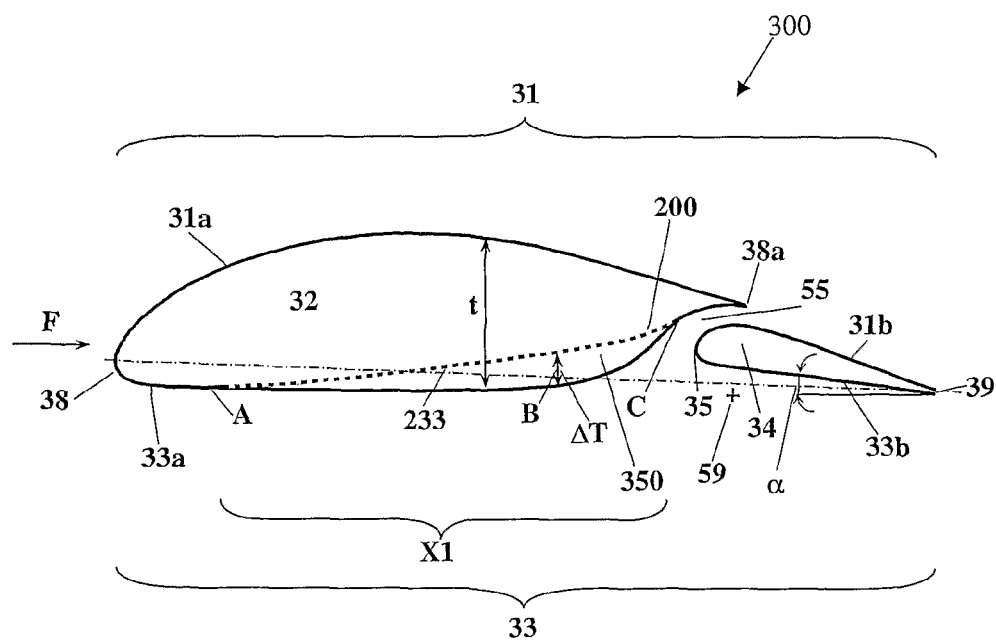
FIG. 1 illustrates an aerofoil section according to a first embodiment of the invention.

According to a first embodiment of the invention, and referring to FIG. 1, a slotted aerofoil generally designated 300 may be based on a baseline aerofoil 200, or at least may be referenced to baseline aerofoil 200 for convenience, the baseline aerofoil 200 having substantially similar geometrical properties with respect to aerofoil 300. The main geometrical difference between the slotted aerofoil 300 and the baseline aerofoil 200 is that in the slotted aerofoil 300 the primary aerofoil element thereof has a profile configured for minimizing accretion of contaminant on the secondary aerofoil element, while the baseline aerofoil 200 is designed based on design rules that do not include specifically providing the primary aerofoil element thereof with a profile specifically configured for minimizing accretion of contaminant on the secondary aerofoil element. The baseline aerofoil 200 may be regarded as having a geometrically substantially identical suction surface and secondary element as for the aerofoil 300.

Slotted aerofoil 300 may be provided for any suitable wings, for example high lift wings of an aircraft, in particular a fixed wing of an aircraft. For the purpose of example, such an aircraft is described herein as a fixed-wing aircraft, comprising a regular subsonic/transonic configuration, having a fuselage section, main wings, empennage (e.g. tailplane, vertical stabilizer), and a propulsion system, but may instead include, mutatis mutandis, any other type of aircraft, for example: rotor-wing aircraft including helicopters; gliders; subsonic/transonic aircraft having canards rather than a tailplane; general aviation aircraft, cruise missiles or other air-delivered ordinance, and so on.

Figure 2:
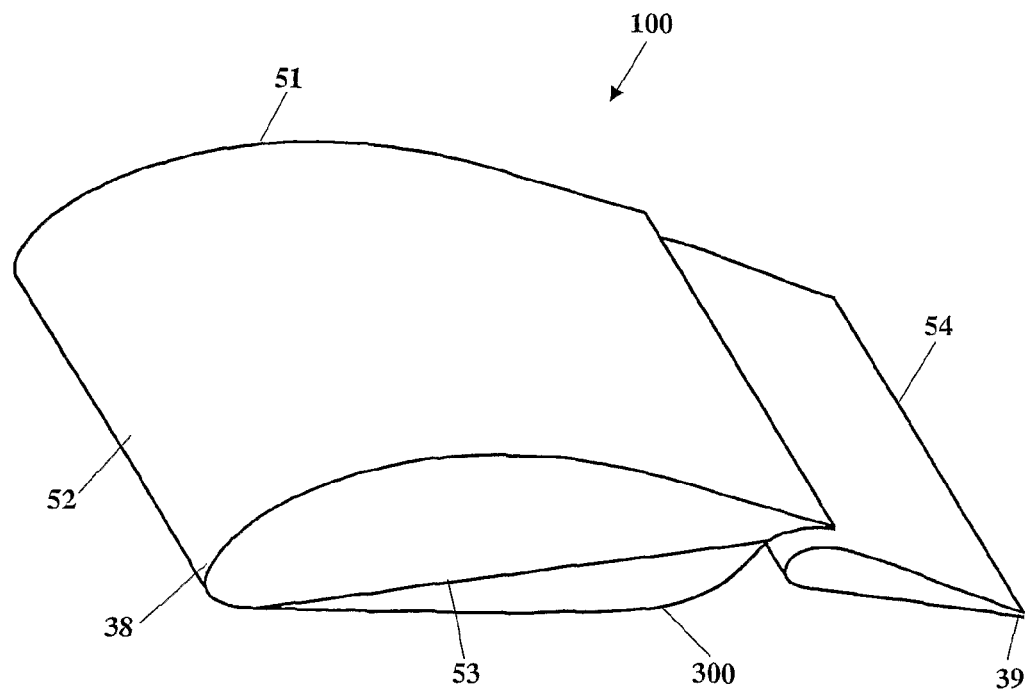
FIG. 2 is an isometric view of a wing element based on the aerofoil embodiment of FIG. 1.

By way of non-limiting example, and referring to FIG. 2, a wing element 100 of a wing is illustrated, based on aerofoil 300, the wing having for example a substantially rectangular plan shape. The wing element 100 may comprise a portion of the span of the wing, or the full span of the wing (port and/or starboard) of the aircraft. The leading edge 52 of the wing element 100 is substantially rectilinear and has a substantially zero sweep angle. The wing element 100 is illustrated having a taper of about 1.0, between the two lateral ends thereof, referred to as the root 51 and the tip 53 of wing element 100. The trailing edge 54 of the wing element 100 is also substantially rectilinear and comprises a substantially zero sweep angle. In alternative variations of this embodiment, the wing element 100 may have a different plan form, for example: swept-back or swept forward, and/or with a different taper ratio (along the full wing, or different taper ratios for different wing elements); and/or having a different plan form, including curved leading edges and/or trailing edges such as an elliptical form, for example; and/or at least some portion of the wing may have a positive, negative or zero dihedral angle; and so on, as appropriate.

Referring also to FIG. 1, the wing element 100 is based on two-element slotted aerofoil 300, having a substantially static primary aerofoil element 32 and an optionally pivotable secondary aerofoil element 34. The primary element 32 comprises the leading edge 38 of the aerofoil, which coincides with the leading edge 52 of the wing element 100, and major portions 31a, 33a, of the suction surface 31 and pressure surface 33 thereof, respectively, and a trailing end 38a. The secondary element 34 comprises the trailing edge 39 of the aerofoil, which coincides with the trailing edge 54 of the wing 10, and minor portions 31b, 33b, of the suction surface 31 and pressure surface 33 thereof, respectively. A slot 55 separates the leading edge 35 of the secondary element 34 from the trailing portion 36 of the primary element 32. For example, the slot 55 may have a width of between about 1% to about 2%, or more, of the aerofoil chord in a non-deflected position of the flap element, though the precise form and width size of the slot 55 may generally depend on the particular mode of operation of the wing. Optionally, the hinge point 59 of the secondary element 34 is outwardly displaced with respect to the lower (pressure) surface of the secondary element 34. A suitable actuation mechanism (not shown) may optionally be provided for actuating the secondary element 34 to adopt the range of positive and/or negative deflection angles desired to enable the same to function as ailerons, flaps and so on. Additionally or alternatively, the secondary element 34 may be spatially and/or rotationally fixed with respect to the primary element 32, and further optionally, the secondary element 34 may comprise or may constitute control surfaces such as ailerons, flaps and so on, that are pivotable with respect to the secondary element 34.

The primary element 32 comprises a profile, in relation to the secondary element 34 for at least one range of design angle of attack and at least one range of secondary element deflection angle, such that the leading edge 35 of the secondary element 34 is effectively shielded with respect to particulate matter that may be flowing along the pressure surface 33a of the primary element 32.

In the embodiment of FIG. 1, the pressure surface 33a of the primary element 32 extends outwardly with respect to a baseline pressure surface profile 233 associated with said baseline aerofoil 200. It is apparent that in this embodiment the thickness t of the primary element 32 just upstream of the gap 55 is greater than and overlaps the maximum thickness of the secondary element 34, as seen along the general flow direction F, and thus the secondary element 34 is not outwardly displaced with respect to the lower (pressure) surface of the secondary element 34 in a direction generally orthogonal to direction F, for a range of angles of attack α starting from 0 degrees or greater.

The profile of pressure surface 33a comprises an outwardly extending or generally convex curvature, with respect to the corresponding profile of the baseline pressure surface profile 233, along at least a portion X1 of the pressure surface 33a, said portion X1 being intermediate between the leading edge 38 and a trailing end 38a of the primary aerofoil element 32. In this embodiment, this portion X1 is a downstream portion, wherein the profile of the pressure surface 33a begins to depart from that of baseline pressure surface profile 233 at a point A downstream of the leading edge 38, peaks at point B, within the second half of the chord of the main aerofoil element, and returns to the baseline pressure surface profile 233 at point C proximate to the trailing end 38a. The additional thickness Δt of the pressure surface X1 with respect to surface profile 233 thus increases smoothly from nominally zero at A to a maximum at B and back to nominally zero again at C smoothly, providing a generally convex surface.

Figure 5:
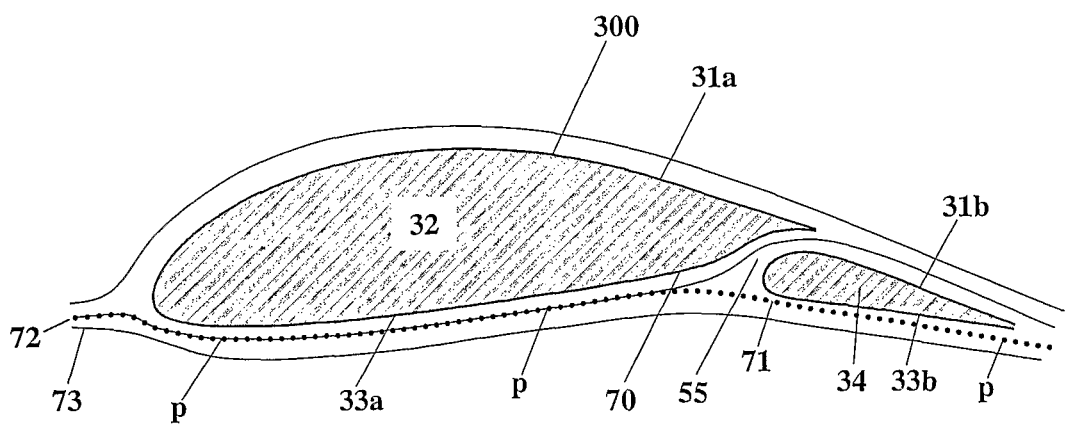
FIG. 5 schematically illustrates operation of the embodiment of FIG. 1 in the presence of particular contaminants in the airflow.

In particular, and referring also to FIG. 5, the profile of aerofoil 300, specially of the portion X1 of the pressure surface is such as to ensure that the airflow over the aerofoil is still maintained—i.e., the flow represented by some streamlines proximate to the pressure surface 33a of the primary aerofoil element 32 follow a path close to the pressure surface 33a, some streamlines 72 close to the pressure surface 33a passing through gap 55 and proceeding over the suction surface 31b of said secondary aerofoil element 34, thereby avoiding separation of the flow with respect to the pressure surface 33a and gap 55, while other streamlines 73 further outboard pass over the pressure surface 33b of the secondary element 34. At the same time, the profile or form of the portion X1 is such as to concurrently provide a trajectory 71 to particulate matter p flowing proximate to the pressure surface 33a, for example along streamline 72, such as to cause said particulate matter to overshoot the gap 55 and flow over the pressure surface 33b of the secondary element 34. This configuration for the aerofoil 300, and particularly the pressure surface 33a, enables the aerofoil 300 to operate as a two-element aerofoil, in a similar manner to the baseline aerofoil 200 (possibly with less performance), but at the same time avoids entrainment of particulate matter p towards the gap 55, and therefore minimizes the possibility or degree of impact and accretion of such matter on the leading edge 35 of the secondary element 34.

While in this embodiment, portion X1 is envisaged as the actual pressure surface of the aerofoil 300 and integral therewith, it is to be noted that aerofoil 300 may instead be constructed by adding a suitably-shaped aerofoil accessory or attachment 350 having an external profile corresponding to that of portion X1, to fit onto the aerofoil 200, such as to essentially replace part of the pressure surface of the aerofoil 200 with a profile provided by the attachment 350. Thus a wing portion based on aerofoil 200 may be converted, permanently or temporarily, to a wing portion based on aerofoil 300 by mounting or otherwise attaching to the pressure surface of the wing a wing accessory based on attachment 350, to effectively change the profile of the wing from that corresponding to aerofoil 200, to that corresponding to aerofoil 300.

Figure 3:
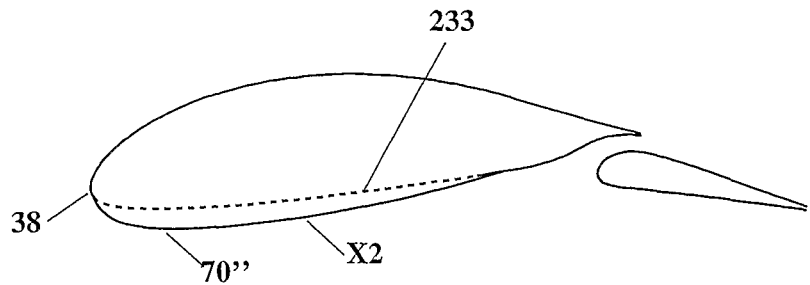
FIG. 3 schematically illustrates a variation of the embodiment of FIG. 1.
Figure 4:
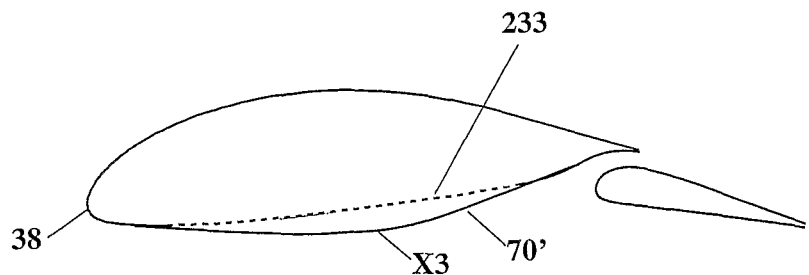
FIG. 4 schematically illustrates another variation of the embodiment of FIG. 1.

In alternative variations of this embodiment, and as illustrated in FIG. 3 and FIG. 4, the profile of pressure surface 33a may comprise an outwardly extending convex curvature, with respect to the corresponding profile of the baseline pressure surface profile 233, along at least a portion X2 or X3, respectively, of the pressure surface 33a, rather than the aforesaid portion X1. While portion X2 or portion X3 are also intermediate between the leading edge 38 and a trailing end 38a of the primary aerofoil element 32, portion X2 is a generally upstream portion, and X3 is a mid portion. In portion X2, the profile of the pressure surface 33a begins to depart from that of baseline pressure surface profile 233 at or close to the leading edge 38, peaking close thereto, within the first half of the chord of the main aerofoil element, and returning to the baseline pressure surface profile 233 at point upstream of the trailing end 38a. In portion X3, the profile of the pressure surface 33a begins to depart from that of baseline pressure surface profile 233 at a point downstream of the leading edge 38, peaking at a point approximately intermediate of the chord of the main element 32, and returning to the baseline pressure surface profile 233 at point upstream of the trailing end 38a.

While the following is directed to the first embodiment based on the portion X1, it applies, mutatis mutandis, also to alternative variations of the first embodiment based on portion X2 or portion X3, for example. The streamline 72 and particle trajectory 71 follow different paths at a particular region 70, in which there is a gradual deviation of the trajectories of water droplet or other particulate matter p from the general airflow direction, on the pressure surface 33a, and, without being bound to theory, may utilize the different inertial properties of air and of the particulate matter p, for example in the form of water droplets, snow or ice fragments, etc. This region 70 may be characterized in providing a change in the flow direction that is too sharp to be negotiated by the particulate matter p, while providing a positive pressure gradient, or at least a sufficiently mild adverse pressure gradient that would not cause the corresponding airflow to become detached from the pressure surface 33a and to flow directly to the pressure surface 33b, rather than to flow through gap 55.

Thus, in the embodiment of FIG. 4, and more so with the embodiment of FIG. 3, mutatis mutandis, the corresponding deviation point or region, 70' and 70", respectively, is further upstream with respect to the leading edge 38 than in the embodiment of FIG. 1. Further, it is to be noted that at high speed flight there is a particular beneficial shielding effect provided by the primary aerofoil element because of the generally small (and sometimes even negative) angle of attack, and the embodiment of FIG. 4 and particularly the embodiment of FIG. 3, may provide enhanced shielding in these conditions, relative to the embodiment of FIG. 1.

In the embodiment of FIG. 1, region 70 is relatively close to the second aerofoil element—this provides an advantage in that it is more difficult for the particles in the air stream to follow the fast change in geometry, in particular the surface contour, and thus for the trajectory of the particles to recover and reemerge with the original streamlines. At the same time, aerodynamic contouring of the portion X1 is made such as to ensure that there is still attached flow through the slot, and thus minimize loss of aileron efficiency provided by rotation of the secondary element.

By providing the region 70 at the mid or forward position along the pressure surface, as exemplified at 70" and 70' in the embodiments of FIGS. 4 and 3, respectively, aerodynamic shaping is easier for minimizing said loss of aileron efficiency. On the other hand the greater distance to the secondary element from the respective region 70' or 70" increases the possibility of the particles to return to the airstream trajectories, and thus potentially reduces the shielding effect of the corresponding portions X3, X2, respectively. The optimal position for the region—whether 70, 70' or 70"—may depend on a number of factors, including one or more of air vehicle size (the length of wing chords), flight airspeeds, the size of water droplets or other contaminants, initial shape of the lower surface of the main aerofoil element, and so on.

Thus, the location and local geometry of this region 70 may vary depending on a number of conditions, and in general, the region 70 may be associated with point B, for example at point B or a relatively short distance upstream or downstream with respect thereto.

For example, the larger the size and mass of the particles, the more upstream the region 70 will tend to be, and the more moderate the curvature of the pressure surface needs to be to provide the required deviation of particles so as to overshoot the gap.

Other conditions may include: —
  Speed and/or momentum (or size) of the particulate matter p flowing over the pressure surface 33a; the higher the speed and/or momentum (or size), the further upstream point 70 may be and/or the less severe the change in direction of stream line 72 at and past point 70 needs to be.
  The location and geometry of the secondary element 34 with respect to the primary element 32.
  The size and shape of the gap 55.

Furthermore, limitations on maximum flight airspeed and effect of the portion X1 (or X2 or X3) on the effectiveness of the second element operating as an aileron or flap may also influence the position of profile of the portion X1 (or X2 or X3, depending on the particular embodiment).

Figure 8A:
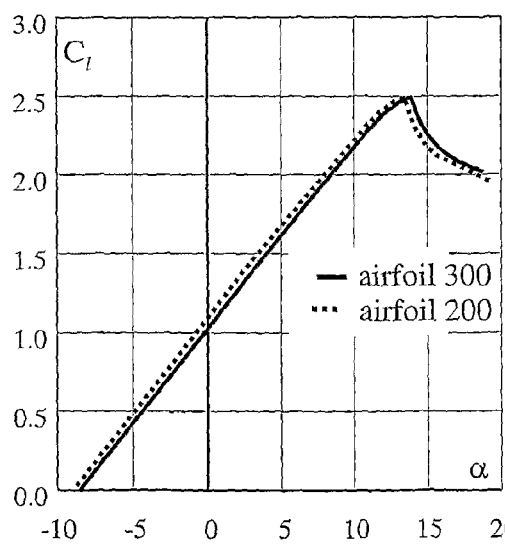
FIG. 8(a) and FIG. 8(b) respectively compare lift coefficients and drag polars, between the embodiment of FIG. 1 and a baseline aerofoil, which are comparatively illustrated in FIG. 8(c).
Figure 8B:
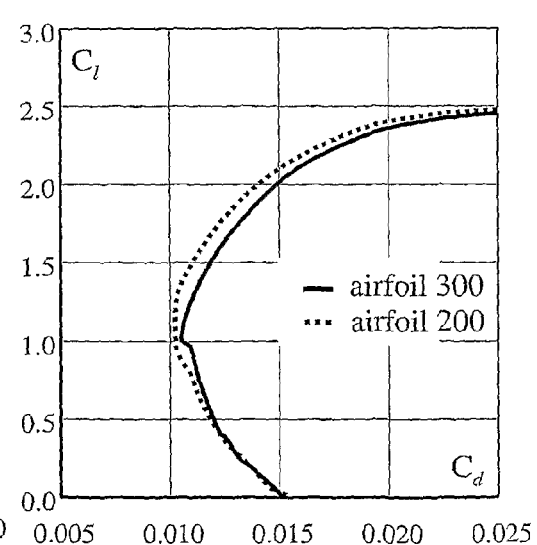
Figure 8C:
Figures 9A, 9B:
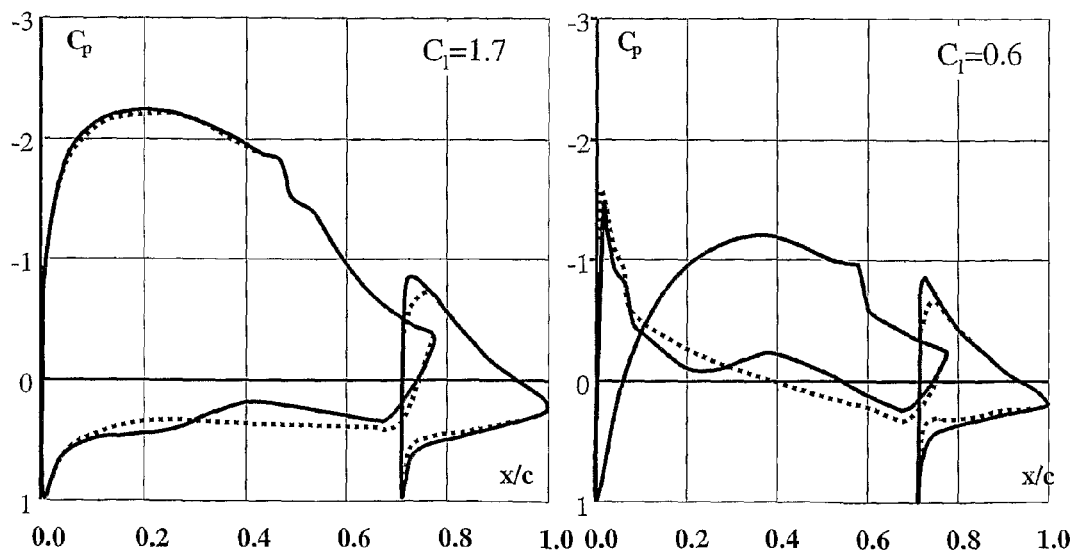
FIG. 9(a) and FIG. 9(b) compare for lift coefficients of 1.7 and 0.6, respectively, pressure distributions obtained with the embodiment of FIG. 1 and a baseline aerofoil.

FIGS. 8(a) and 8(b) compare the lift coefficient as a function of angle of attack a, and drag polars, respectively, obtained with a baseline aerofoil and an aerofoil according to the first embodiment of the invention (for convenience also illustrated in FIG. 8(c)), based on CFD methods. The coordinates of the two aerofoils are given in FIGS. 18 and 17, respectively. FIGS. 9(a) and 9(b) compare the pressure distributions obtained with a baseline aerofoil and an aerofoil according to the first embodiment of the invention, based on CFD methods, at lift coefficient of 1.7 and 0.6, respectively. FIG. 10(a) provides, for the baseline aerofoil (for convenience also illustrated in FIG. 10(b)), skin friction coefficient as a function of chord, for lift coefficients of 0.2, 0.5 and 1.0, based on CFD methods. FIG. 11(a) provides, for the aerofoil according to the first embodiment of the invention (for convenience also illustrated in FIG. 11(b)), skin friction coefficient as a function of chord, for lift coefficients of 0.6, 1.0, 1.7, based on CFD methods.

Alternatively or additionally, the position of the second element 34, and/or its thickness, relative to the position and/or thickness of the primary element 32 may also be modified such that the primary element 32 effectively shields the secondary element 34 from the flow trajectory of the particulate matter, the local geometry of the two elements still being sufficient form enabling the airflow to flow over the same and through the gap.

By way of non-limiting example, the datum aerofoil 300 may comprise an 18% thickness ratio, and has $Re_{design}=1.0*10^6$, though clearly the datum aerofoil may comprise other characteristics, mutatis mutandis, such as design lift coefficient ($C_{ldesign}=1.7$ in the case of datum airfoil), different main body/flap chord ratios (for datum airfoil the flap chord is 30% of the total airfoil chord), etc.

Aerofoil 300 may be designed or generated in a number of ways. For example, the baseline aerofoil 200 is first designed according to the regular criteria to provide the desired performance to the aerofoil 200 in the absence of contaminants such as for example rain, ice, snow, and so on.

Then a number of iteration loops are conducted. In each loop, the profile of the pressure surface 33a is extended in at outward direction by a predefined increment, and for example this may take the form of a percentage of the thickness of the main element 32, at a particular position—point B or close to a candidate point 70 (FIG. 5)—the extension of the surface decreasing on either side of this point towards points A and C in a generally smooth manner. The performance of the modified aerofoil is then estimated using known methods—for example CFD programs, wind tunnel testing and so on. The trajectory of particulate matter flowing close to the pressure surface 33a is also calculated, using for example two-phase flow (e.g., air and water droplets) CFD programs having an inertia option for the flow. If the performance of the modified aerofoil and/or the trajectory of the particulate matter p is not acceptable, the aerofoil profile is again changed, for example by changing one or more of the amount of the projection, the location of the maximum projection and the profile of the pressure surface 33a between point B and points A and C. The trial and error approach may be continued until a suitable compromise between aerofoil performance and particulate trajectory is achieved. Of course, in some cases it may also be possible to change other parameters of the aerofoil, such as for example the chord and/or thickness of the main element 32, the position and/or profile of the second element 34, and so on.

Furthermore, the above iteration procedure may be repeated for a range of angles of attack of the aerofoil, wherein small or negative angles of attack may provide the desired effect in particulate trajectory, though at a performance penalty compared with higher angles of attack.

The possibility of flow separation at the slot region is a factor that additionally may be analyzed and corrected if necessary at each design iteration. In general, at small lift coefficients there is a conflict between the requirement to avoid ice accretion on secondary element, which may be configured for operating as flaps and/or ailerons, for example, and the desirability to minimize drag penalties due to flow separation and resulting limitation on maximum speed flight. On the other hand, at high lift coefficients, due to angle of attack effect, the second element is more exposed, relatively speaking, to the airflow, carrying particulate matter, such as water droplets etc., for example, and at least according to one aspect of the invention this may be considered as a baseline case for ice accretion on the secondary element, and most of iterative design efforts may correspondingly be directed to such a case, for example. In the high lift case, flow separation at the slot region is generally highly unlikely because of favorable accelerating pressure gradient.

Thus, such an iterative design process can be focused on providing a compromise between accretion at high lift coefficients (loitering flight) and flow separation at small lift coefficients (maximum speed flight). The compromise may include the limitations on maximum speed flight and may also include the limitations on minimum speed flight also.

Furthermore, in variations of the first embodiment in which the second element 34 may be deflected, the above iteration process may be repeated for a number of different deflection angles, wherein relatively large positive deflections may provide the desired effect in particulate trajectory. Negative deflections of the second element 34 (effectively resulting in wing decambering) are generally beneficial for drag recovery at high-speed flight (small lift coefficients). However, increased angle of attack is required to provide the same lift coefficient as for the non-deflected case, and this is unfavorable for accretion on the second element, for example ice accretion, because the second element 34 is then more exposed to the airflow with water droplets. On the other hand, positive deflection of the second element 34 decreases the required angle of attack for a given lift coefficient, effectively improving the favorable shielding effect of the main body at all angles of attack. However, at small lift coefficients (high-speed flight), this may accelerate flow separation on the lower surface of the main body 32, while at high lift coefficients, ice or other particulate accretion on positively deflected flap segment (second element 34) may trigger the stall of this element and stall of the wing. Accordingly, the iterative design positive is preferably augmented with suitable wind tunnel and other testing of a design for the aerofoil.

It is to be noted that the wing element 100 may comprise the same aerofoil to profile 300 along the span thereof, or alternatively, the aerofoil profile may vary along the span. In the latter case, the aerofoil shape itself may remain the same, but the size thereof may vary—for example the chord may increase from tip 53 to root 51, or alternatively, the shape may also change, for example providing a different thickness chord ratio at the tip 53 to that at the root 51. In each case, the corresponding aerofoil sections may be designed as disclosed herein for aerofoil 300, mutatis mutandis.

According to another aspect of the invention, the leading edge 38 of the main element 32 and/or the leading edge 35 of the secondary element 34 may comprise a relatively large radius to minimize accretion thereat.

Figures 6A, 6B:
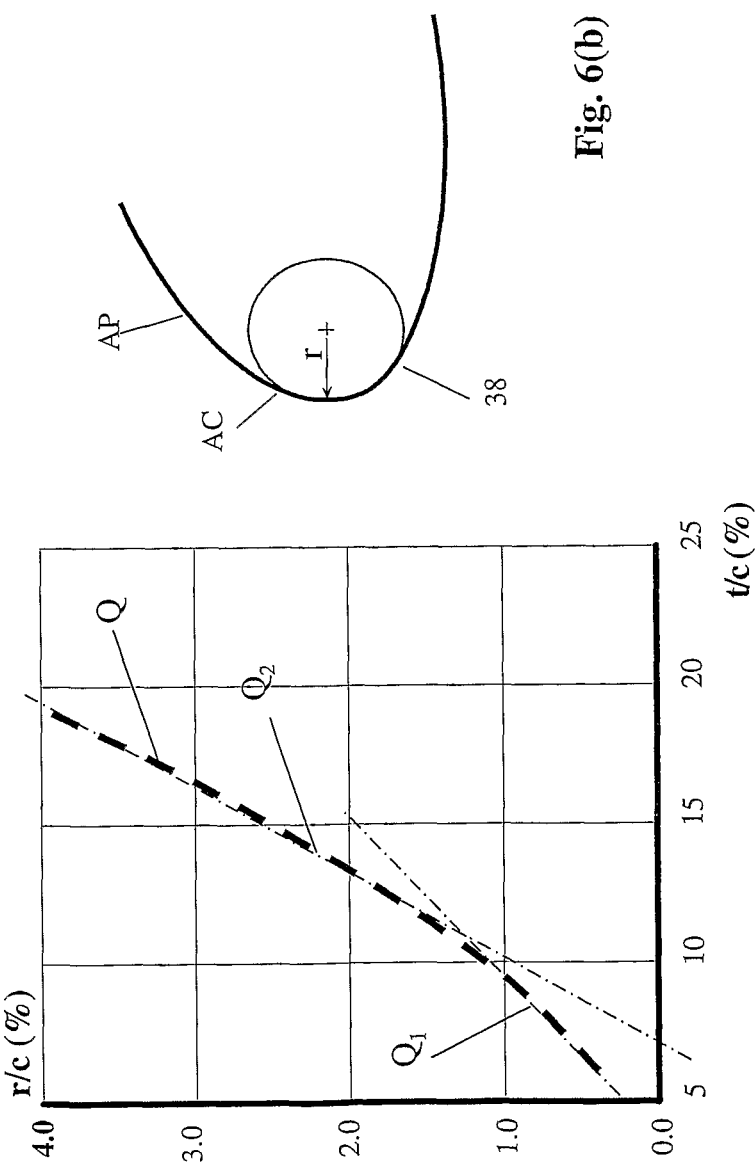
FIG. 6(*a*) illustrates a threshold of leading edge radius to chord ratio vs. thickness to chord ratio, obtained from NACA 4-digit aerofoils.

Referring to FIGS. 6(*a*) and 6(*b*), the leading edge radius of the leading edge 38, as a percentage of the aerofoil chord, i.e., ratio (r/c) of aerofoil 300, may be greater than that provided by the threshold Q, for a given thickness to chord ratio (t/c) for the aerofoil 300. For example, for a t/c ratio of about 15%, the r/c ratio can be greater than about 2.5%. Similarly, FIG. 6(*a*) can also be used to provide, mutatis mutandis, an indication of leading edge 35 radius of the secondary element 34 according to this aspect of the invention, wherein the leading edge radius of the leading edge 35, as a percentage of the second element chord (r'/c') may be greater than that provided by the threshold Q, for a given thickness to chord ratio (t'/c') for the second element, and for example, for a t'/c' of about 15%, the r'/c' ratio can be greater than about 2.5%.

The threshold Q is defined herein as a best fit curve through a series of data points relating to the leading edge radius to chord ratio and thickness to chord ratio of the NACA 4-digit series of aerofoils. Threshold Q may be approximated by two linear distributions: distribution Q1 for t/c less than about 10%, and distribution Q2 for t/c greater than about 11%.

Furthermore, the leading edge geometry for the leading edge 38 and/or the leading edge 35 may include a circular arc portion AC associated with the corresponding relatively large leading edge radius, and a "protection area" or "protection region" AP on the suction surface immediately downstream of the leading edge circular portion having an increased local radius (reduced curvature) with respect to portion AC, and which serves to prevent or reduce a leading edge suction peak at high lift coefficients, providing high values of maximum lift for the aerofoil. This leading edge geometry may also be beneficial in reducing the effect of particulate accretion, in particular ice accretion or the like, facilitating spreading of the ice around the leading edge and delaying formation of horn ice on the leading edge.

Figure 7:
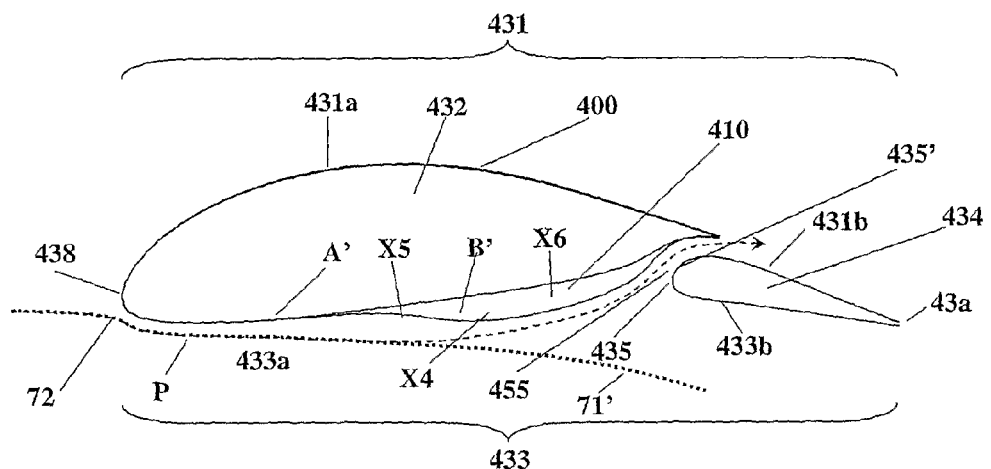
FIG. 7 illustrates an aerofoil section according to a second embodiment of the invention.

Referring to FIG. 7, a slotted aerofoil 400 according to a second embodiment of the invention comprises all the elements as disclosed for the first embodiment, mutatis mutandis, the main difference being that in the second embodiment, the primary element is configured for providing a stronger shielding effect to the second element of the aerofoil than with the first embodiment. Similarly, a wing element may be based on aerofoil 400, mutatis mutandis.

Thus aerofoil 400, which can also be compared to or based on reference aerofoil 200, and comprises a substantially static primary aerofoil element 432 (comprising leading edge 438, major portions 431*a*, 433*a*, of the suction surface 431 and pressure surface 433 thereof, respectively, and a trailing end 438*a*), and an optionally pivotable secondary aerofoil element 434 (comprising the trailing edge 439 of the aerofoil, and minor portions 431*b*, 433*b*, of the suction surface 431 and pressure surface 433 thereof, respectively) and a slot 455 separating the leading edge 435 of the secondary element 434 from the trailing portion 436 of the primary element 432.

In the second embodiment, the profile of pressure surface 433*a* also comprises an outwardly extending curvature, with respect to the corresponding profile of the baseline pressure surface profile 233, along a portion X4 of the pressure surface 433*a*, said portion X4 being intermediate between the leading edge 438 and a trailing end 438*a* of the primary aerofoil element 432, from a point A' downstream of the leading edge 438, and returns to the baseline pressure surface profile 233 at point C' proximate to the trailing end 438*a*. However, in this embodiment, the portion X4 comprises an upstream generally concave part X5 that smoothly dovetails into a downstream convex part X6 at point of inflexion B'. X5 thus resembles a curved surface that is generally facing towards a focal point or region thereof (away from the direction of the aerofoil), with the rate of change of slope of the contour of X5 generally increasing up to point B'. The generally concave portion X5 is configured for imparting a centrifugal acceleration to particulate matter p, such as for example water droplets carried by the airstream, for example as represented by streamline 72, thus directing the particulate matter p in a trajectory 71' away from the second element 434. On the other hand, the generally convex portion X6 is configured for turning the airflow (for example streamline 72) towards the slot 455, but presents too steep a turn for the particulate matter p, due to the inertial properties thereof which are different from the inertial properties of air, and thus overshoot past the stagnation point 435' of the secondary element 434, and away from the pressure surface 433*b* of the secondary element 434. X6 thus resembles a curved surface that is generally facing away from a focal point or region thereof.

Figure 12A:
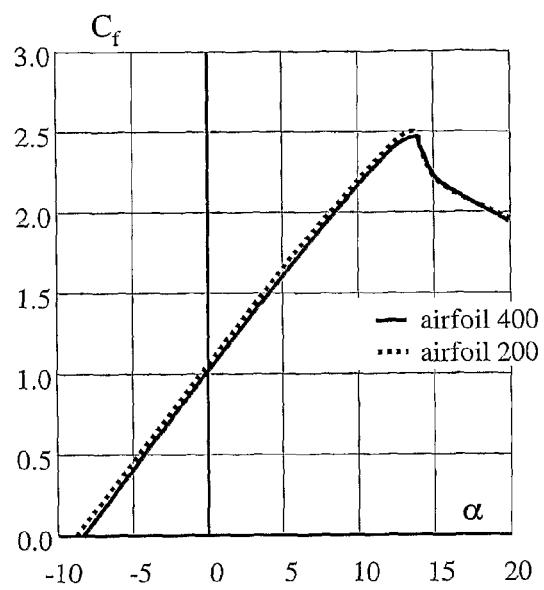
FIG. 12(a) and FIG. 12(b) respectively compare lift coefficients and drag polars, between the embodiment of FIG. 7 and a baseline aerofoil, which are comparatively illustrated in FIG. 12(c).
Figure 12B:
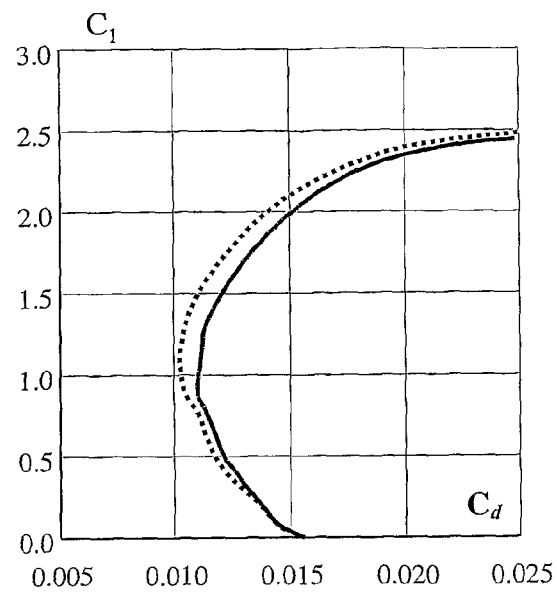
Figure 12C:
Figures 13A, 13B:
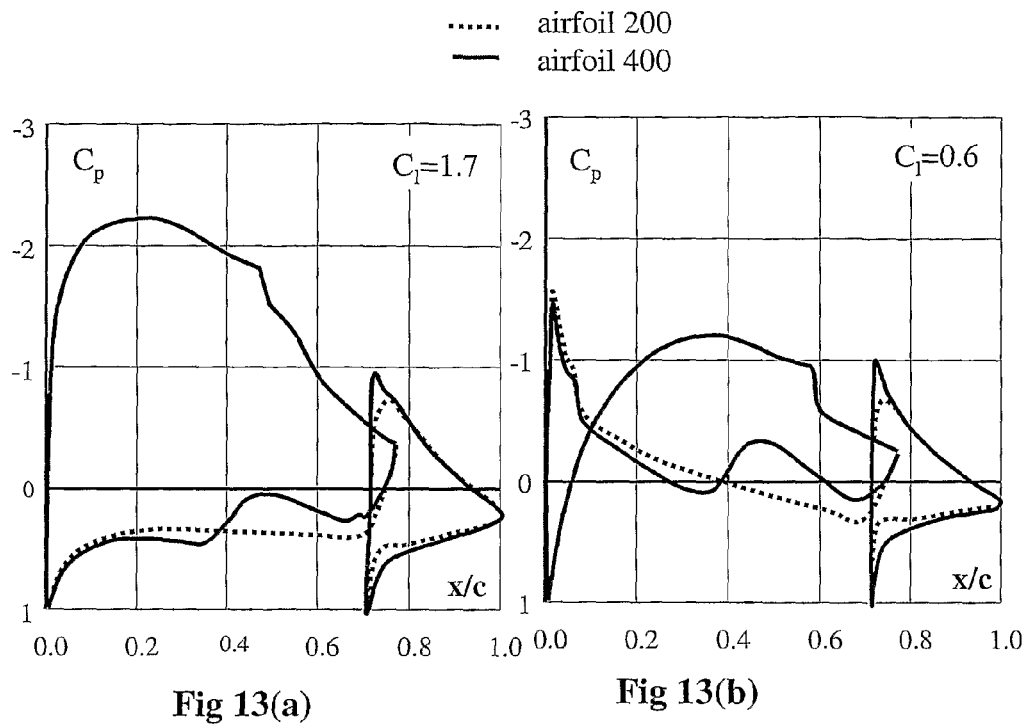
FIG. 13(a) and FIG. 13(b) compare for lift coefficients of 1.7 and 0.6, respectively, pressure distributions obtained with the embodiment of FIG. 7 and a baseline aerofoil.
Figures 14A, 14B:
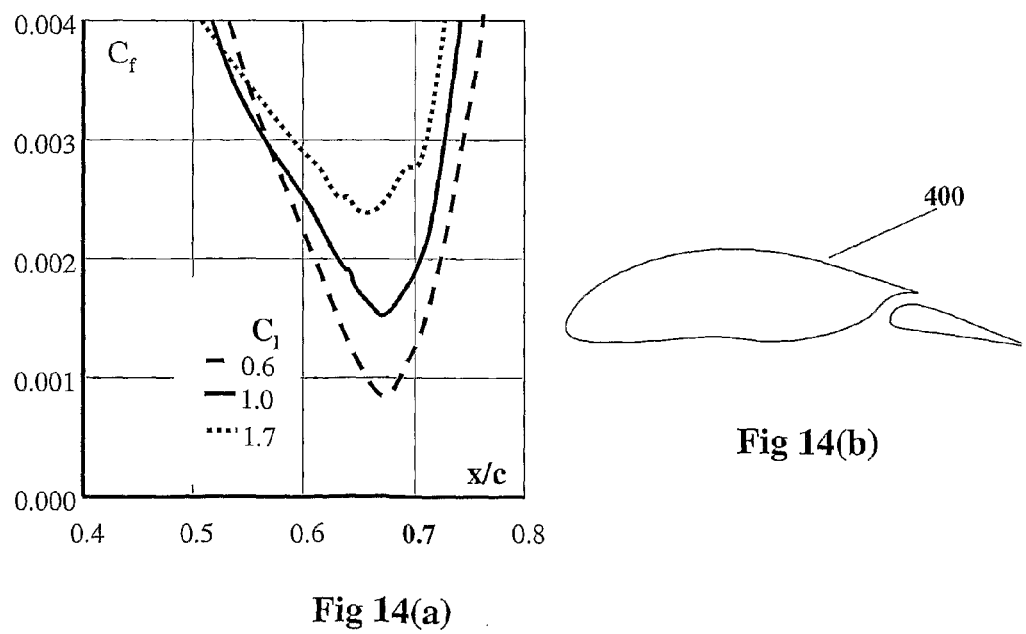
FIG. 14(a) provides distributions of skin friction coefficients obtained with the embodiment of FIG. 7 (also illustrated in FIG. 14(b)) at a number of lift coefficients.

FIGS. 12(*a*) and 12(*b*) compare the lift coefficient as a function of angle of attack α, and drag polars, obtained with a baseline aerofoil and an aerofoil according to the second embodiment of the invention (for convenience also illustrated in FIG. 12(*c*)), based on CFD methods. The coordinates of the two aerofoils are given in FIGS. 19 and 17, respectively. FIGS. 13(*a*) and 13(*b*) compare the pressure distributions obtained with a baseline aerofoil and an aerofoil according to the second embodiment of the invention, based on CFD methods, at lift coefficient of 1.7 and 0.6, respectively. FIG. 14(*a*)

provides, for the aerofoil according to the second embodiment of the invention (for convenience also illustrated in FIG. 14(b)), skin friction coefficient as a function of chord, for lift coefficients of 0.6, 1.0, 1.7, based on CFD methods.

Figures 20A, 20B:
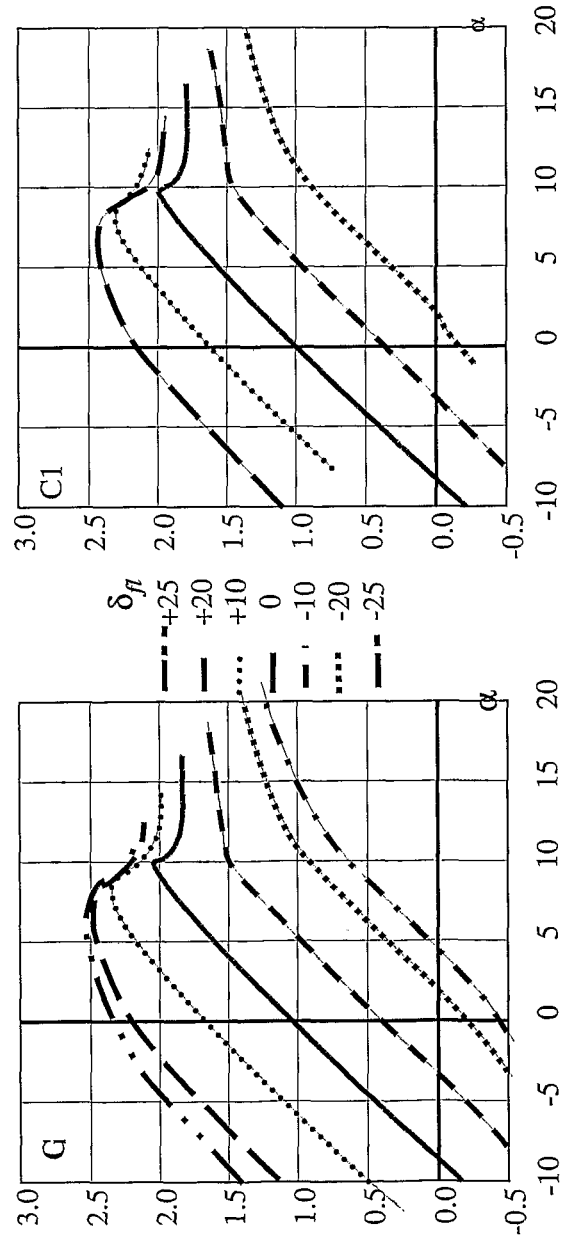
FIGS. 20(a) and 20(b) compare the lift coefficients obtained with a baseline aerofoil and with the embodiment of FIG. 7, for a range of positive and negative deflection angles for the secondary aerofoil element in each case.

FIGS. 20(a) and 20(b) compare the lift coefficients obtained with a baseline aerofoil and an aerofoil according to the second embodiment of the invention, based on CFD methods, for a range of positive and negative deflection angles for the secondary aerofoil element in each case, at $Re=10^6$.

Figure 15:
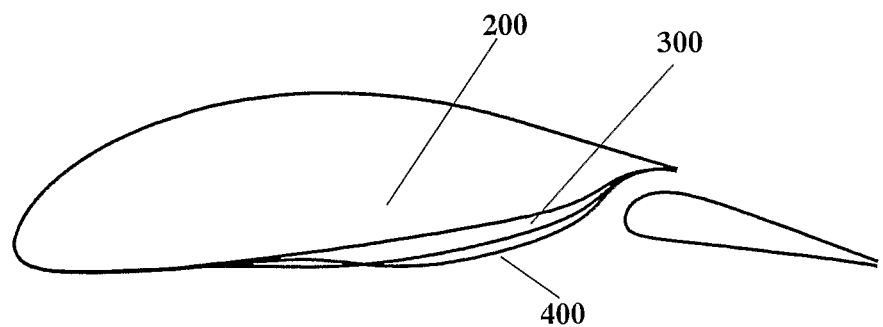
FIG. 15 compares the geometric profiles of the embodiments of FIG. 1 and FIG. 7 with the geometric profile of a baseline aerofoil.

FIG. 15 graphically compares the profiles of aerofoils 300 and 400 with baseline aerofoil 200.

Figure 16A:
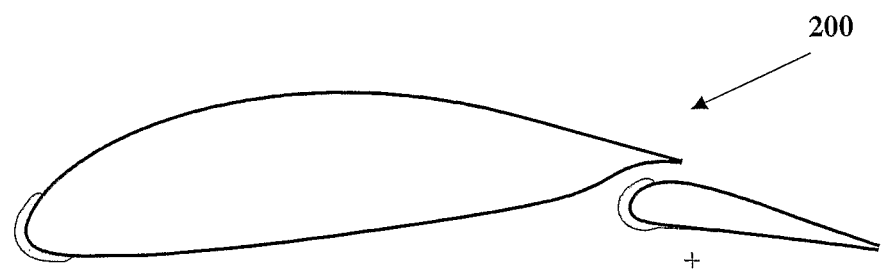
FIG. 16(a) and FIG. 16(b) compare preliminary calculations of ice accretion profiles obtained with the embodiment of FIG. 7 and a baseline aerofoil, respectively, at conditions of: $C_1=1.5$; Velocity=36 m/s; exposure time=30 minutes.
Figure 16B:
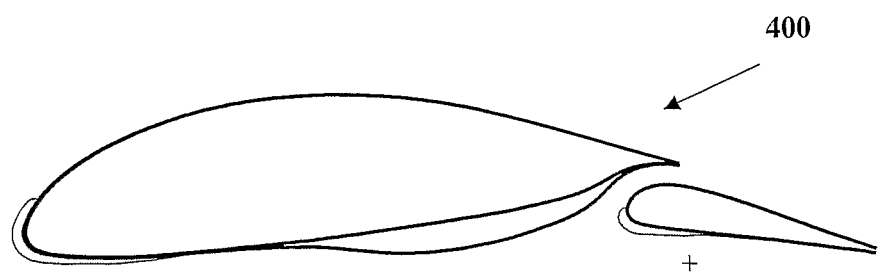

Regarding the first and second embodiments, there may be some lift and drag penalties of the aerofoils according to these embodiments relative to the reference airfoil. However, it is contemplated that the critical trade-off will be between possible adverse influence of the enlarged pressure surface on efficiency and travel of the secondary element as an aileron, and the ability of the primary element to provide a shielding effect on the second element. Preliminary theoretical calculations of ice accretion obtained with the second embodiment are illustrated in FIG. 16(a) and FIG. 16(b), and as may be seen from these figures, at high loitering lift coefficient (for example, $C_l=1.5$), the region of ice accretion may move to the lower surface of the secondary element, allowing for rotation of the second aerofoil element and retaining aileron efficiency, in contrast with the datum aerofoil, where similar conditions result in ice accretion on the leading edged of the secondary element, reducing aileron efficiency and travel.

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed example embodiments in accordance with the invention, it will be appreciated that many changes may be made therein without departing from the spirit of the invention.

The invention claimed is:

1. A two element aerofoil comprising a primary aerofoil element including a leading edge of the aerofoil and a secondary aerofoil element including a trailing edge of the aerofoil, and comprising a gap between said primary aerofoil element and said secondary aerofoil element, the primary aerofoil element having at least one of a profile, orientation and location with respect to a respective at least one of a profile, orientation and location of said secondary aerofoil element configured for minimizing or avoiding accretion of contaminant on said secondary aerofoil element when subjected to an airflow comprising the contaminant, at least at one design set of conditions, wherein the contaminant is in the form of particulate matter flowing in a downstream direction with respect to said leading edge of said aerofoil, and wherein said aerofoil comprises a profile configured to ensure that at least some streamlines proximate to said pressure surface of said primary aerofoil element follow a path including over a suction surface of said secondary aerofoil element via said gap, while concurrently providing a trajectory to particulate matter flowing in said at least some streamlines proximate to said pressure surface of said primary aerofoil element to cause said particulate matter to overshoot said gap.

2. The aerofoil according to claim 1, wherein a pressure surface of said primary aerofoil element comprises a pressure surface profile configured for minimizing accretion of said particulate matter on said secondary aerofoil element.

3. The aerofoil according to claim 1, wherein said pressure surface profile is configured for minimizing flow into said gap of said particulate matter that may be flowing over said pressure surface.

4. The aerofoil according to claim 3, wherein said pressure surface profile is configured for minimizing or preventing flow into said gap of said particulate matter that may be flowing along or proximate to a boundary layer over said pressure surface.

5. The aerofoil according to claim 1, wherein said pressure surface profile is further configured to enable airflow through said gap for enabling aerodynamic operation of said two element aerofoil.

6. The aerofoil according to claim 5, wherein said airflow through said gap is generally consistent with providing high lift aerodynamic characteristics to said aerofoil.

7. The aerofoil according to claim 1, wherein said particulate matter comprises at least one of ice, snow, rain, water droplets, sand, smoke particles and dust particles.

8. The aerofoil according to claim 1, wherein said pressure surface profile comprises a convex curvature along a portion of the chord of said primary aerofoil element, said portion being intermediate between said leading edge of the aerofoil and a trailing end of said primary aerofoil element.

9. The aerofoil according to claim 1, wherein said pressure surface profile comprises a concave portion configured for imparting a centrifugal force component to said particulate matter, and a downstream convex portion joined thereto at an inflexion point.

10. The aerofoil according to claim 1, wherein said primary element comprises a first cross-sectional thickness that effectively overlaps a second cross-sectional thickness of the secondary element when viewed from the flow direction upstream of the aerofoil.

11. The aerofoil according to claim 1, wherein said primary element comprises a first cross-sectional thickness having a boundary corresponding to the pressure side of the primary element that effectively overlaps at least an upstream portion of the pressure surface of the secondary element when viewed from the flow direction upstream of the aerofoil.

12. The aerofoil according to claim 11, wherein said secondary element comprises a deflection in the range between about +25 degree and about −25 degrees.

13. The aerofoil according to claim 1, wherein said aerofoil is configured as a high lift two element aerofoil.

14. The aerofoil according to claim 1, wherein a leading edge of said primary aerofoil element is blunt having a first leading edge radius, wherein a ratio of said first radius to a chord of said aerofoil is greater than a threshold value, said threshold value representing a minimum radius to chord ratio obtained from geometric data of NACA 4-digit aerofoils that have a value of thickness to chord ratio that is comparable to a thickness to chord ratio of said aerofoil.

15. The aerofoil according to claim 1, wherein a leading edge of said secondary aerofoil element is blunt having a second leading edge radius, wherein a ratio of said second radius to a chord of said second element is greater than a threshold value, said threshold value representing a minimum radius to chord ratio obtained from geometric data of NACA 4-digit aerofoils that have a value of thickness to chord ratio that is comparable to a thickness to chord ratio of said second element.

16. A wing wherein at least a span portion thereof comprises wing sections corresponding to at least one aerofoil of claim 1.

17. An air vehicle comprising at least one wing according to claim 16.

18. An air vehicle according to claim 17, wherein said air vehicle is a UAV.

19. A method for minimizing or avoiding accretion of contaminant on a two element aerofoil, said aerofoil comprising a primary aerofoil element including a leading edge of the aerofoil and a secondary aerofoil element including a trailing edge of the aerofoil, and a gap therebetween, the method comprising providing the primary aerofoil element with at least one of a profile, orientation and location with respect to a respective at least one of a profile, orientation and location of said secondary aerofoil element such as to minimize or avoid accretion of contaminant on said secondary aerofoil element when subjected to an airflow comprising said contaminant, at least at one design set of conditions,
   wherein the contaminant is in the form of particulate matter flowing in a downstream direction with respect to said leading edge of said aerofoil, and
   wherein said aerofoil is provided with a profile configured to ensure that at least some streamlines proximate to said pressure surface of said primary aerofoil element follow a path including over a suction surface of said secondary aerofoil element via said gap, while concurrently providing a trajectory to particulate matter flowing in said at least some streamlines proximate to said pressure surface of said primary aerofoil element to cause said particulate matter to overshoot said gap.

20. The method according to claim 19, comprising aligning said primary aerofoil element at an angle of attack, and aligning said secondary aerofoil element at a deflection angle with respect to the primary aerofoil element, such as to ensure said at least some streamlines proximate to a pressure surface of said primary aerofoil element follow a path to a suction surface of said secondary aerofoil element via said gap, while concurrently providing a trajectory to particulate matter flowing in said at least some streamlines proximate to said pressure surface of said primary aerofoil element such as to cause said particulate matter to overshoot said gap.

21. The method according to claim 20, wherein said angle of attack and said deflection angle are such as to enable said primary aerofoil element to effectively shield the secondary aerofoil element from said particulate matter.

22. The method according to claim 20, wherein said angle of attack is non-positive, and said deflection angle is positive.

23. A method for designing a two element aerofoil comprising a primary aerofoil element including a leading edge of the aerofoil and a secondary aerofoil element including a trailing edge of the aerofoil, and a gap therebetween, the method comprising generating an aerofoil profile to ensure that at least some streamlines proximate to a pressure surface of said primary aerofoil element follow a path including over a suction surface of said secondary aerofoil element via said gap, while concurrently providing a trajectory to particulate matter flowing in said at least some streamlines proximate to said pressure surface of said primary aerofoil element such as to cause said particulate matter to overshoot said gap.

\* \* \* \* \*